(12) United States Patent
Martucci et al.

(10) Patent No.: US 8,498,899 B2
(45) Date of Patent: Jul. 30, 2013

(54) METHOD FOR PROVIDING ROOM SERVICE

(75) Inventors: Jennifer Martucci, Muttontown, NY (US); Patrick Martucci, Muttontown, NY (US)

(73) Assignee: Incentient LLC, Plainview, NY (US)

( * ) Notice: Subject to any disclaimer, the term of this patent is extended or adjusted under 35 U.S.C. 154(b) by 275 days.

(21) Appl. No.: 12/399,734

(22) Filed: Mar. 6, 2009

(65) Prior Publication Data
US 2010/0076854 A1 Mar. 25, 2010

Related U.S. Application Data (60) Provisional application No. 61/099,757, filed on Sep. 24, 2008.

(51) Int. Cl.
*G06Q 30/00* (2006.01)
*G06Q 50/00* (2006.01)

(52) U.S. Cl.
USPC ............................ 705/15; 715/810; 709/219

(58) Field of Classification Search
None
See application file for complete search history.

(56) References Cited

U.S. PATENT DOCUMENTS

| 6,356,874 | B1 | | 3/2002 | Ohrn | |
| 6,384,850 | B1 | * | 5/2002 | McNally et al. | 715/810 |
| 7,022,017 | B1 | | 4/2006 | Halbritter et al. | |
| 7,092,892 | B1 | | 8/2006 | Sobalvarro et al. | |
| 7,945,477 | B2 | * | 5/2011 | Werbitt | 705/15 |
| 2003/0083889 | A1 | * | 5/2003 | Macklin | 705/1 |
| 2004/0059815 | A1 | | 3/2004 | Buckingham et al. | |
| 2004/0075679 | A1 | * | 4/2004 | Carter et al. | 345/733 |
| 2007/0038727 | A1 | * | 2/2007 | Bailey et al. | 709/219 |
| 2007/0050197 | A1 | | 3/2007 | Efron et al. | |
| 2008/0141297 | A1 | * | 6/2008 | Dawson et al. | 725/32 |

FOREIGN PATENT DOCUMENTS

JP 2006277437 * 10/2006

OTHER PUBLICATIONS

Michael Gros, "Case Study: VAR Cooks Up E-Menu for Holiday Inn," retrieved from the internet, Sep. 17, 2004 http://www.crn.com/networking/47212335.

Gaylord Palms Resort & Convention Center, "Gaylord iConnect In-Room Computing System to Revolutionize Hotel Experience," News Release, 2008.

* cited by examiner

*Primary Examiner* — Luna Champagne
(74) *Attorney, Agent, or Firm* — Howison & Arnott, L.L.P.

(57) ABSTRACT

A method of processing room service transactions in an institution such as a hotel, having a plurality of guest rooms includes displaying selected visual representations of food items at predetermined intervals with a user device including an interactive graphical user interface in a guest room, receiving inputs from a guest with the graphical user interface and transmitting the inputs to a food service server for fulfillment.

12 Claims, 10 Drawing Sheets

METHOD FOR PROVIDING ROOM SERVICE

CROSS-REFERENCE TO RELATED APPLICATIONS

This application claims the benefit of U.S. Provisional Application for Patent Ser. No. 61/099,757, filed Sep. 24, 2008, and entitled METHOD FOR PROVIDING ROOM SERVICE, the specification of which is incorporated by reference in its entirety.

TECHNICAL FIELD

This disclosure relates to providing room service to guests of hotels and similar institutions whereby food items are prepared and provided to the guests in their rooms and in particular to an automated system for receiving and processing orders from guests.

BACKGROUND

"Room Service" is an accommodation to guests of hotels and similar institutions whereby guests of the hotel may order food, beverages and other items from a food service facility maintained by the hotel for consumption in the guest's room. Typically, a guest selects items from a printed menu placed in the room, calls a telephone number and places an order for the selected items. The order is transmitted to food service personnel who then prepare the order. After the order has been prepared, the food service personnel notify members of the hotel staff that deliver the order to the guest's room.

Many hotel guests would rather stay in their rooms and work or engage in other activities rather than spending their time in a hotel restaurant or finding another dining establishment at another location. Consequently, a large number of hotel guests consider prompt and efficient room service to be an important amenity. Thus, it not surprising that failure to provide room service that meets guest expectations is a major cause of guest complaints for hotels and similar institutions.

However, the current methods for providing room service tend to be inefficient for a number of reasons. Telephone orders may be misinterpreted and the wrong items provided. Language barriers may result in orders being misunderstood or misinterpreted. If the hotel staff responsible for taking a guest's order is busy with another task, the guest may be put on hold until the staff member is available to take the guest's order. Further, since the orders are placed verbally, there is no clear audit trail to determine what a guest actually ordered. Thus, there exists a need for a system and method which provides prompt, efficient room service with minimized errors and which provides a means of recording guest orders with certainty.

SUMMARY

In one aspect, a method of processing room service transactions in an institution, such as a hotel, having a plurality of guest rooms includes displaying selected visual representations of food items at predetermined intervals with a user device including an interactive graphical user interface in a guest room. In one embodiment, the displayed visual representations of food items are selected based on the time of day, i.e., breakfast items are displayed in the morning, lunch items during the mid-day and dinner items during the evening. The displayed images are alternated at predetermined intervals, for example every three, five or ten seconds.

The displayed food selection visuals may be photographs or images of selected food items available from the institution's food service facilities at that time. A prompt is displayed on the interactive graphical user interface, inviting guests to user the service. A begin input is received from the guest with the interactive graphical user interface to initiate a room service transaction and a food selection menu is displayed. In one embodiment, the food selection menu may give the guest the option of choosing from time appropriate food items or selections, or from an "anytime" menu.

A selection input corresponding to a food item is received with the interactive graphical user interface and stored with a data storage device associated with the graphical user interface. A summary of food items selected by the guest is displayed after each selection and the selection process is repeated until a place order input is received from the guest with the graphical user interface. After the place order input is received, a summary of the selected food items is displayed with the graphical user interface. The display gives the guest the options of continuing to order, changing the order or confirming the selection of food items using the graphical interface.

After the guest has confirmed the food order, the user device transmits a confirmed food order including the selections chosen by the guest to a dedicated food service server. The dedicated food service server includes an associated data storage device, a processor and a data interface with one or more server stations. The server stations may be located in a food preparation area, in a restaurant maintained by the institution, a cocktail lounge or other area where orders may be displayed and/or accessed to staff members. After the order has been received by the food service server, a message is displayed in the guest room with the interactive graphical user interface indicating to the guest that the food order is being prepared.

After the food order is prepared and is ready for delivery to the guest room, a staff member responsible for delivering the order may confirm receipt of the order from food preparation staff using a server station. In this regard, the staff member may enter one or more of an employee identifier, the guest room number and a transaction identifier with the server station before the food order is delivered. A message may then be transmitted from the food service server to the user device in the guest room and a message displayed with the interactive graphical user interface indicating the food order is en route to the guest room.

In one embodiment, after the order is delivered to the guest room, the staff member that delivered the order may enter a delivery confirmation message input from the guest room with the interactive graphical user interface. The delivery confirmation message is received by the food service server that stores a record of the room service transaction on the data storage device associated with the server. The food service server may be configured to receive a report request from a server station and generate a report of room service transactions for a predetermined period of time. In other embodiments, the food service server may be programmed to automatically generate reports of food service transactions at predetermined times.

In one embodiment, a wireless interface or access point is used to interconnect a plurality of interactive graphical user interfaces in guest rooms with the dedicated food service server. A wireless interface or access point may also be used to interface the dedicated food service server with the server stations. In one embodiment, the food service server may be configured and programmed to translate food orders into a format suitable for use by a point of sale device maintained by the institution. The translated order is then transmitted to the point of sale device for user by the institution's billing system.

In another aspect, a system for processing room service transactions in an institution having a plurality of guest rooms includes a plurality of user devices in the guest rooms. The user devices each include an interactive graphical user interface, a first data storage unit including a database of visual food representations and menus and a room processor. The room processor is operative with the database and interactive graphical user interface to display visual representations of selected food items based on the time of day, to display menus, and to receive and store guest selections entered by a guest using the graphical user interface. Each of the user devices is interfaced with a food service server. The food service server includes a processor and a second data storage unit including a database operative to store and transmit orders received from a room processor. A data transmission interface between the user devices and the food service server enables orders entered by guests using the graphical user interface in a guest room to be transmitted to the food service server.

A server station interfaced with the food service server includes an interactive graphical user interface, a third data storage unit and a station processor and is operable to receive and transmit order information. In one variation, the system further comprises a point of sale device operable to receive electronically transmitted food orders from the food service server and where the food service processor is operable with instructions stored on the second data storage unit to translate orders received from the room processor into a format usable by a point-of-sale device.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements through-out, the various views and embodiments of methods for providing room service are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
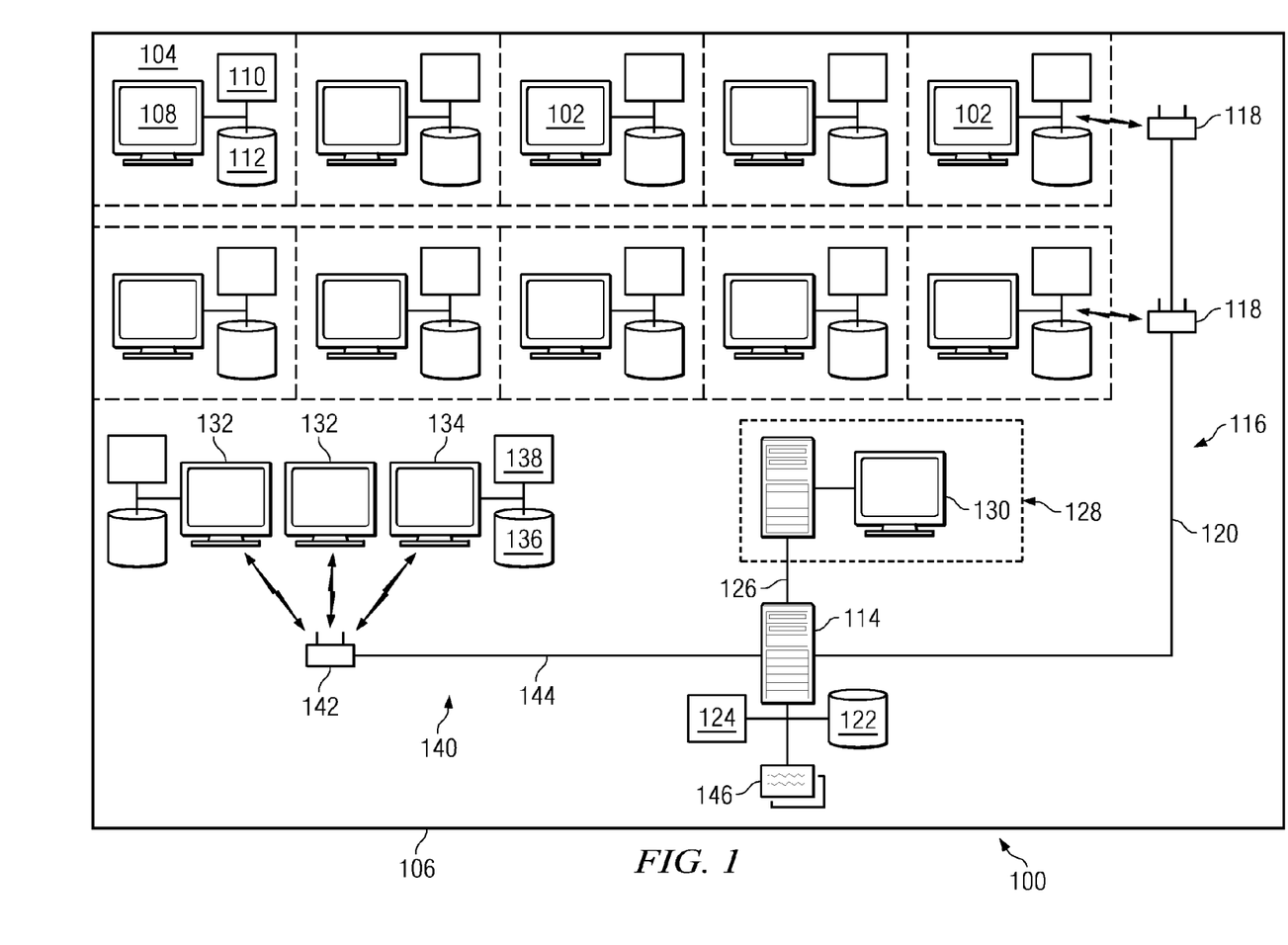
FIG. 1 is a schematic representation of a system for processing room service orders according to one embodiment.

Referring to FIG. 1, in one embodiment, a system 100 for providing room service to guests of hotel includes a plurality interactive user devices 102 provided in guest rooms 104 of a hotel 106. Although the system and method are described in connection with a hotel, it will be appreciated that the system and method may be employed in other settings, for example in dormitories, retirement and assisted living facilities, and similar institutions where guests or residents may wish to order food, beverages and similar items for consumption or use in the rooms that they are occupying.

In one embodiment, each of user devices 102 includes an interactive graphical user interface 108, a processing unit 110 and a data storage device 112. In one embodiment, graphical interfaces 108 are touch screens, i.e., displays which can detect the presence and location of a touch within the display area. In other embodiments, graphical interfaces 108 may comprise a video monitor with an associated data input device such as a keyboard or wireless transmitter. As described in further detail below, user devices 102 provide a means by which food selections and other information may be displayed to guests and by which guests may place room service orders.

System 100 further includes one or more dedicated food service file servers 114. Each of interactive user devices 102 is connected to dedicated food service server 114 by means of a data interface generally designated 116. In one embodiment, data interface 116 comprises wireless routers 118 and Ethernet cable 120 that provide data transmission between servers 114 and user devices 102. Dedicated servers 114 include a data storage device 122 and an associated processor 124. In one embodiment, a data interface 126 is provided between server or servers 114 and a separate hotel billing system 128, including one or more electronic point of sale devices 130. A point of sale device (POS) or terminal typically has the ability to record and track customer orders using application specific software, and to interface with other systems such as the hotel billing system. In this embodiment, food service server 114 may be operable to translate room service orders and transactions into a format useable by a point of sale device and/or the hotel billing system using a translation program or instructions stored on data storage device 122. Interfacing food service server 114 with point of sale device 130 allows hotel billing system 128 to automatically bill the order to the guest room without manual entry of the order. In other embodiments, data interface 126 may be omitted and orders may be entered manually into hotel billing system 128.

Referring still to FIG. 1, in one embodiment system 100 further includes one or more server stations 132. In one embodiment, each of server stations 132 includes a graphical user interface 134, a data storage device 136 and a processor 138. Server stations 132 communicate with food service processor(s) 114 by means of a data interface 140, for example one or more wireless routers 142 and/or Ethernet cable 144. Server stations 132 may be located in the hotel restaurant, food preparation area, cocktail lounge or similar locations to provide a means by which guest orders entered with user devices 102 may be communicated to hotel staff. Server stations 132 may be used to display room service orders, and to provide hotel staff a means of interfacing with food service processor 114, for example to confirm receipt of food service orders for delivery to guest rooms. In one embodiment, food service server 114 is also interfaced with a printer 146. Printer 146 may be used to generate various reports, print hard copies of food orders or "tickets" and similar functions.

Figure 2:
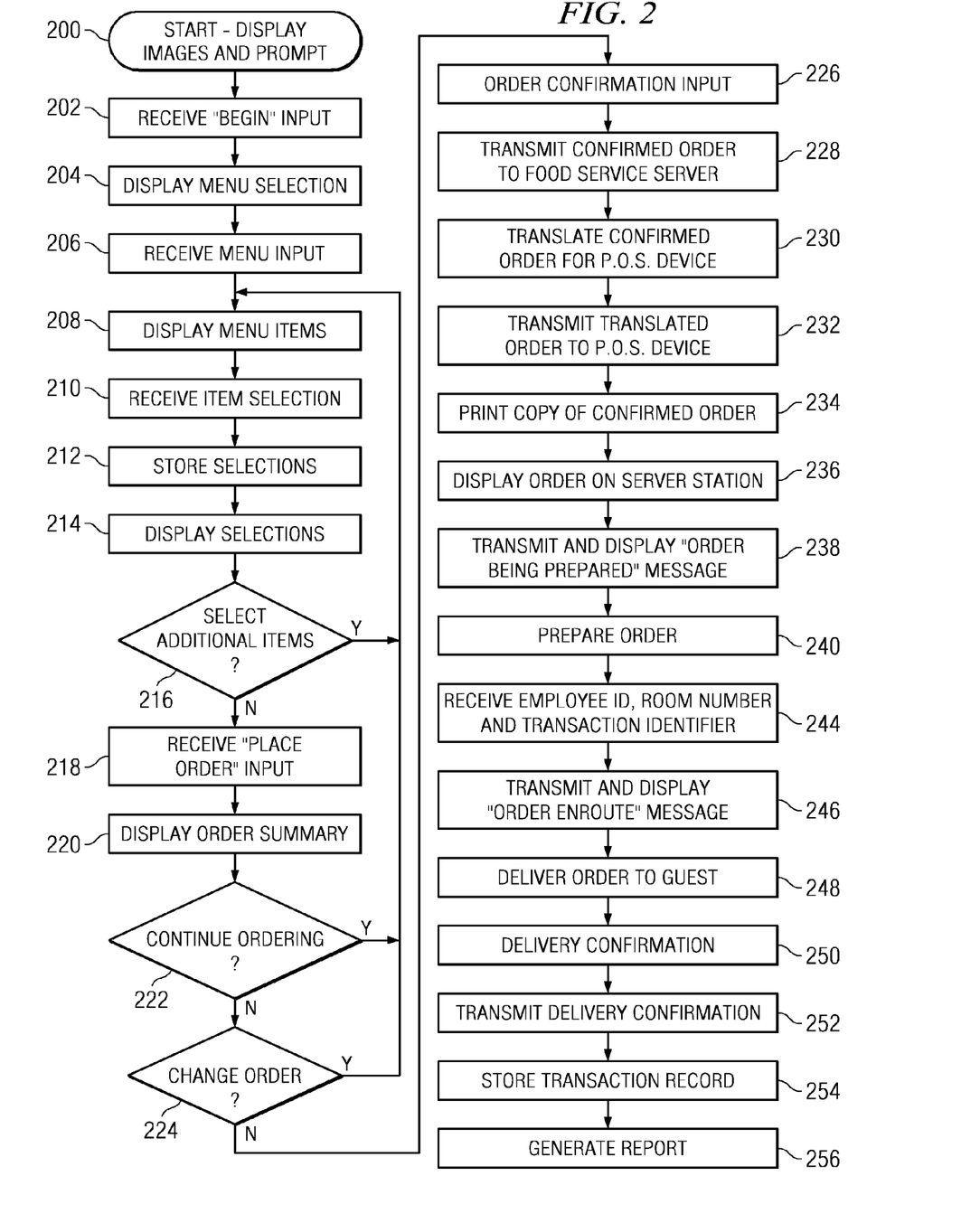
FIG. 2 is a flowchart illustrating a method of providing room service according to one embodiment.
Figure 3:
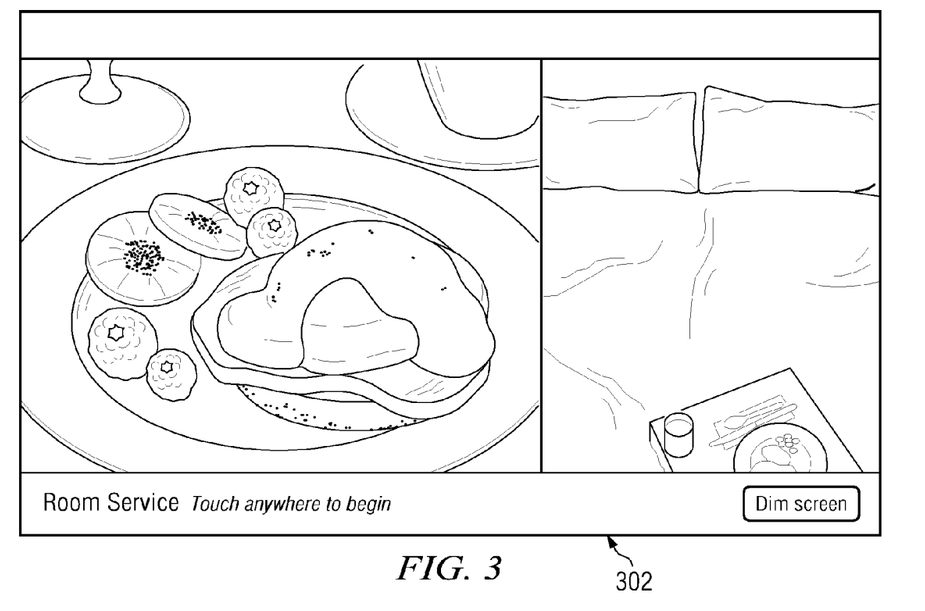
FIG. 3 is a first exemplary screen display for use with the system and method for providing room service according to the disclosure.
Figure 4:
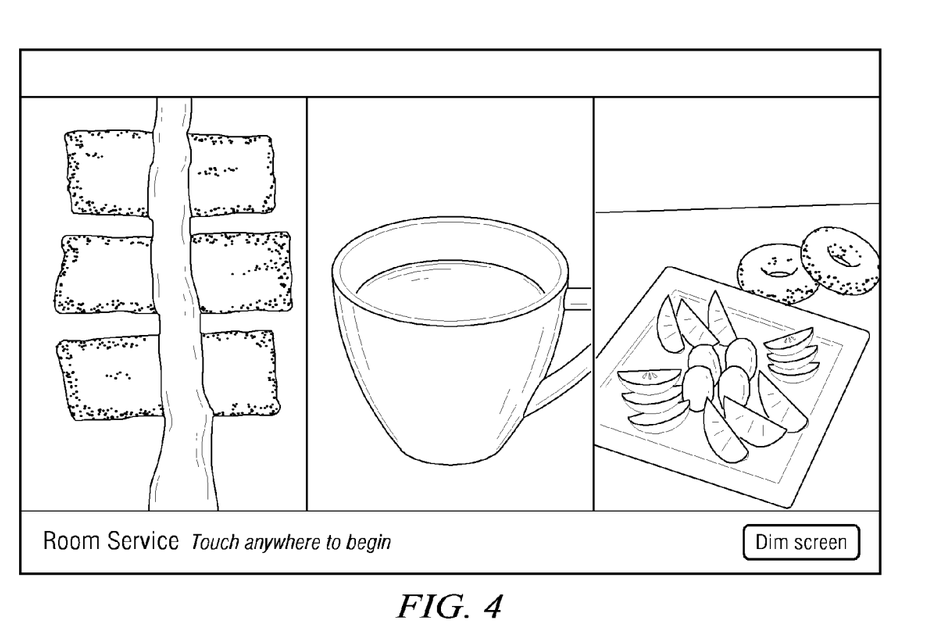
FIG. 4 is a second exemplary screen display for use with the system and method for providing room service according to the disclosure.

FIG. 2 is a flowchart of a method of providing room service employing the system of FIG. 1. The process begins at 200 where images of food items are displayed using graphical user interfaces 108 in guest rooms 104 of hotel 106. In one embodiment, user device 102 is preprogrammed to display particular food images during predetermined times so that the displayed food items are appropriate for the particular time of day. For example, images of breakfast items such as illustrated in FIGS. 3 and 4 may be displayed between 6:00 a.m. and 11:00 a.m., after which lunch items may be displayed for a predetermined period followed by dinner items. In one embodiment, user device 102 is preprogrammed to display images of only the food items available from the hotel's kitchen at that particular time.

In one embodiment, user device 102 may be programmed such that the displayed food images or visuals will be alternated at predetermined intervals, for example every three, five or ten seconds in order to attract the guest's attention and to present different food items that may interest the guest. For example, pictures or photos including a fruit plate may be alternated with pictures or photographs of a breakfast including eggs and coffee or pictures of a breakfast including pancakes. In one embodiment, the alternating images of different food items are displayed for intervals less than ten seconds. A prompt 302 is displayed along with the images inviting the guest to use the hotel's room service. Other images designed to draw a guest's attention to features and amenities of the hotel, such as photographs or other images of the hotel's swimming pool, exercise room may also be displayed at predetermined intervals.

Figure 5:
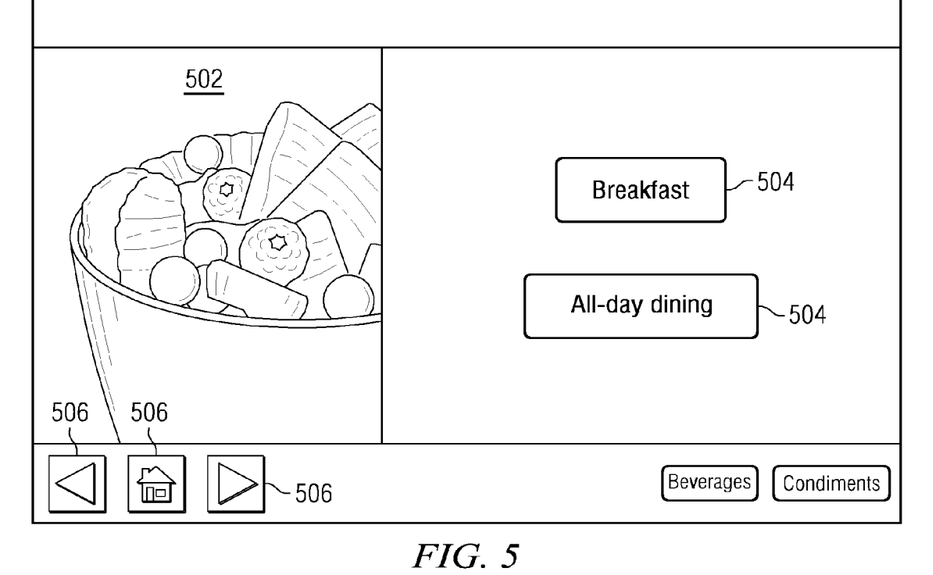
FIG. 5 is a third exemplary screen display for use with the system and method for providing room service according to the disclosure.

At step 202 user device 102 receives a "begin" input from a guest wishing to utilize room service. In the case where user device 102 includes a touch screen, a guest may enter the input by touching the screen of interactive user display 108. Upon receiving the "begin" input, user device 102 displays a menu selection screen at step 204 enabling the guest to choose between a time appropriate menu, for example a breakfast menu, and an all-day dining menu. An exemplary menu selection display is illustrated in FIG. 5. In other embodiments, only time appropriate items may be presented. As illustrated, the display may include images or visuals 502 of available food items, menu selection buttons 504 as well as navigation buttons 506 that allow the guest to make selections and/or move back and forth between displays by pressing the indicated area on the display.

Figure 6A:
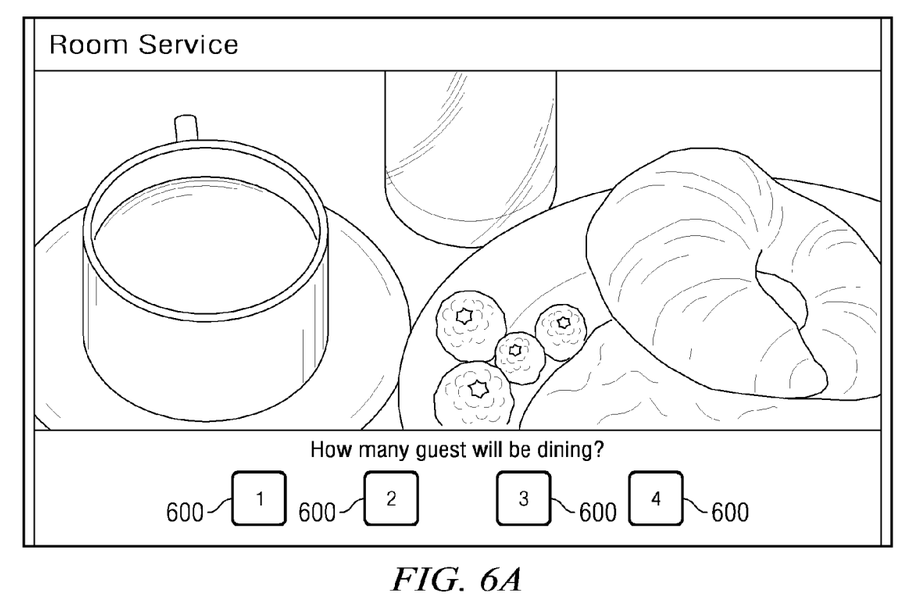
FIGS. 6A-6E are exemplary screen displays for use with the system and method for providing room service according to the disclosure.
Figure 6B:
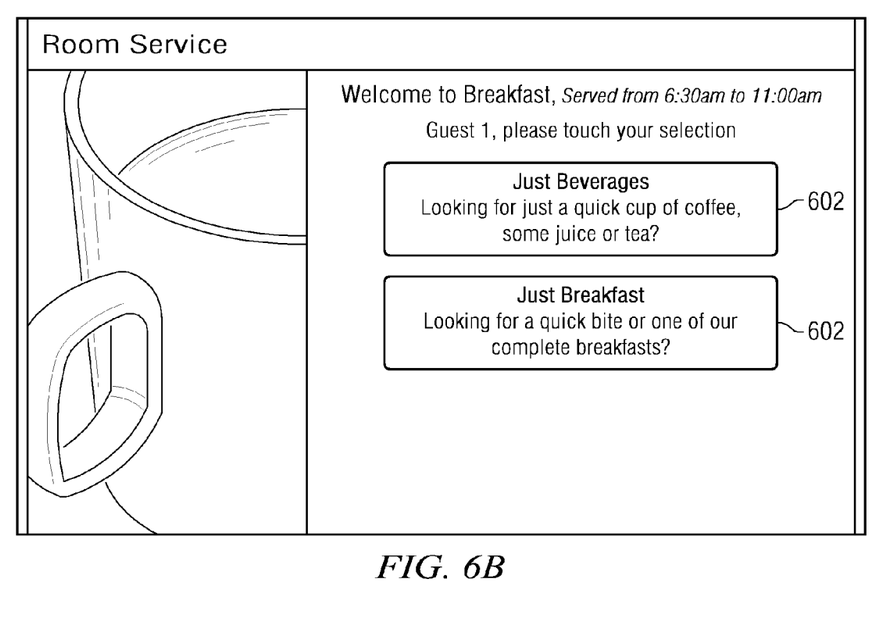
Figure 6C:
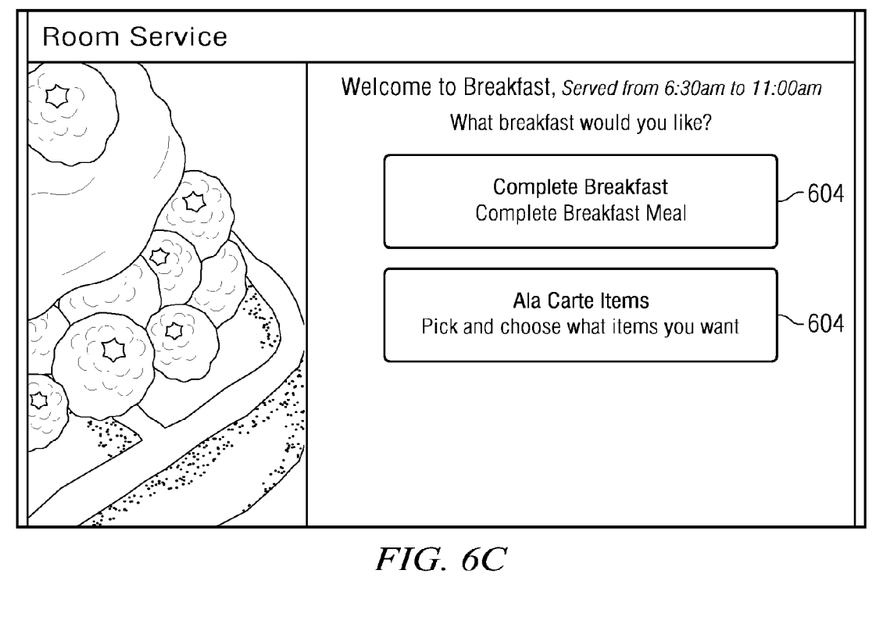
Figure 6D:
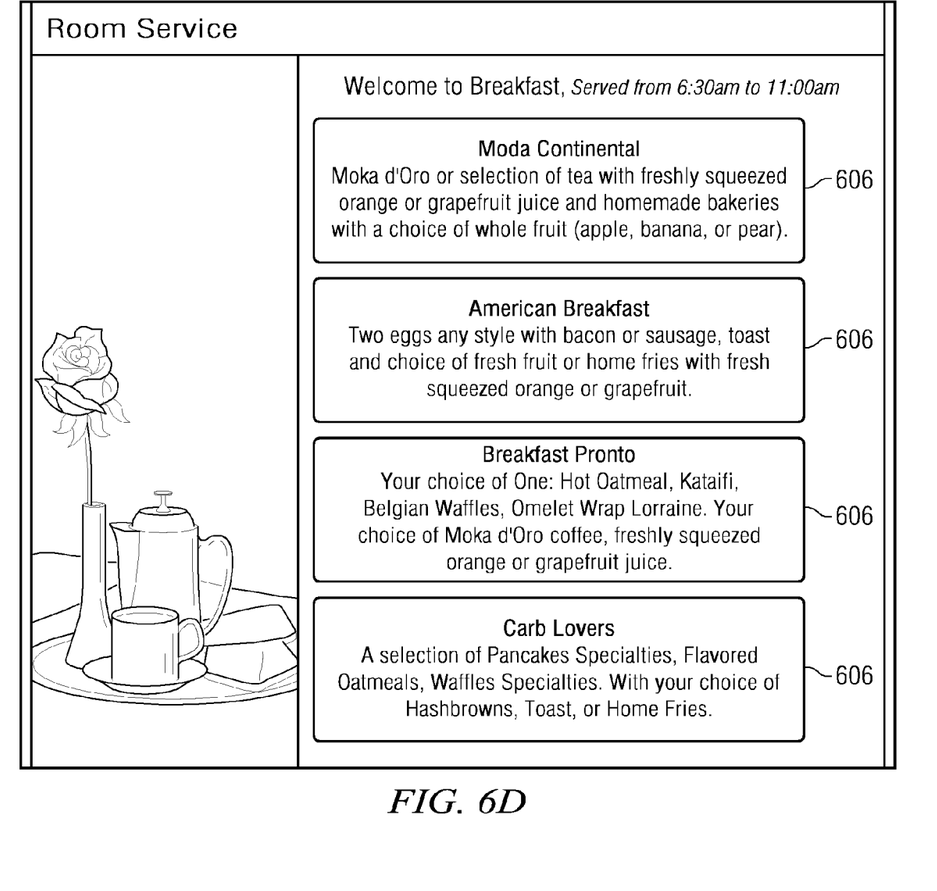

At step 206, user device 102 receives a menu selection from the guest and displays one or more menus to the guest at step 208. As illustrated in FIGS. 6A-6E, the menus and options may be displayed in stages, allowing the guest to proceed from more general selections to more specific items. To start, the display may prompt the guest to enter the number of diners by pressing the indicated screen areas 600 as illustrated in FIG. 6A. The guest may be presented with the option of selecting between a meal such as breakfast or beverages as shown in FIG. 6B by pressing areas 602. As shown in FIG. 6C the guest may select from a complete meal, such as a breakfast or individual ala carte items, by touching areas 604 of the display. In the event that the guest selects a complete breakfast, the guest may be presented with the option of selecting between a continental breakfast, an American-style breakfast, an oriental-style breakfast or other choice as illustrated in FIG. 6D by touching or pressing areas 606. If for example, the guest selects an American-style breakfast, the guest may be presented with a display similar to that illustrated in FIG. 6E, wherein the guest may select individual items represented by "buttons" 608 presented on the graphical user interface.

Figure 6E:
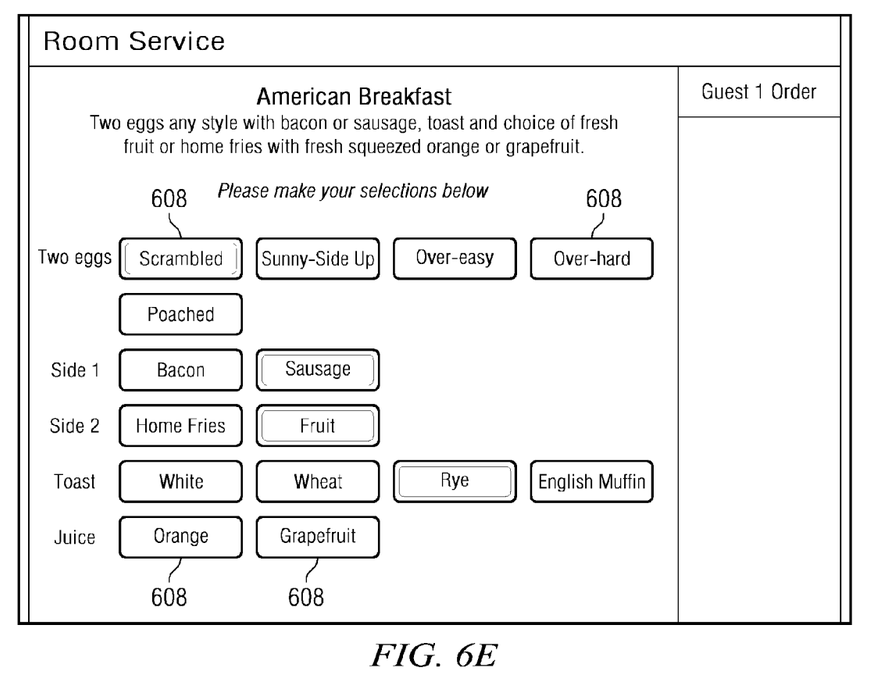
Figure 7:
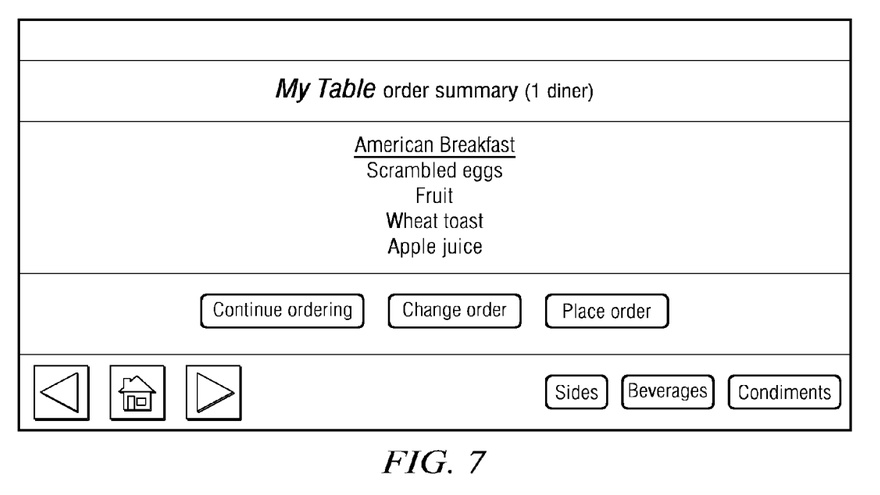
FIG. 7 is another exemplary screen display for use with the system and method for providing room service according to the disclosure.

At step 210, the user device receives a menu item selection entered by the guest. The selection is stored by user device 102 at step 212 and the selection is displayed, for example by high-lighting or brightening the selected item on the menu display at step 214 (FIG. 6E). In other embodiments the selected items may be displayed in a separate window. At step 216, the guest may choose to add other items to his or her order, in which case the process loops back to step 208. When the guest has completed his or her selections, user device 102 receives a "place order" input from the guest at step 218 and displays a summary of the order for the guest to review at step 220. An exemplary summary screen is illustrated in FIG. 7. As illustrated, the order summary display allows the guest to continue ordering, change his or her order or place the order. If the guest elects to continue ordering at step 222 or change his or her order at step 224, the process loops back to step 208 and menu items are displayed.

At step 226, user device 102 receives an order confirmation input entered by the guest. User device 102 transmits the confirmed order to food service server 114 at step 228. In one embodiment, server 114 translates the confirmed order into a format suitable for use by a point of sale device (POS) at step 230 and transmits the confirmed order to the POS for processing by hotel billing system at step 232. In other embodiments, steps 230 and 232 may be omitted, in which case a printed copy of the order may generated and the order entered into the hotel billing system manually.

At step 234, the confirmed order is printed. In one embodiment, the confirmed order will be in the form of a "ticket" that includes a transaction identifier, (e.g. ticket number), the room number from which the order originated and the ordered items to facilitate entry of the order into the hotel's billing system. The order may also be displayed on a server station 132 for use by the hotel's food preparation staff at step 236. At step 238, an "order being prepared" message is transmitted from food service server 114 to user device 102 and displayed to inform that the guest's order is being prepared. The guest's order is prepared at step 240.

After the guest's order has been prepared, the hotel employee responsible for delivery of the food order takes possession of the order. In one embodiment, the employee confirms receipt of the food order by entering information such as an employee ID number or identifier, the room number to which the order is to be delivered and the transaction identifier (ticket number) using server station 132 at step 244. After receiving confirmation that the employee has received the order for delivery, food service server transmits an "Order Enroute" message to user device 102, which displays a message informing the guest that the order is on the way to his or her room at step 246.

At step 248, the order is delivered to the guest's room. After the order has been delivered the hotel employee or staff member who delivered the order confirms delivery of the order with user device 102 at step 250. User device 102 transmits the order confirmation to food service server 114 at step 252. In one embodiment, if for some reason the staff member is unable to confirm delivery of the order with user device 102, he or she may confirm delivery using server station 132.

After confirmation of delivery, food service server 254 stores a record of the completed transaction. In one embodiment, at step 256 food service server 114 may be used to generate a report or reports including food service transactions processed with system 100. The report may be generated at predetermined intervals, for example every 24 hours or on demand by hotel staff using server station 132.

Figure 8:
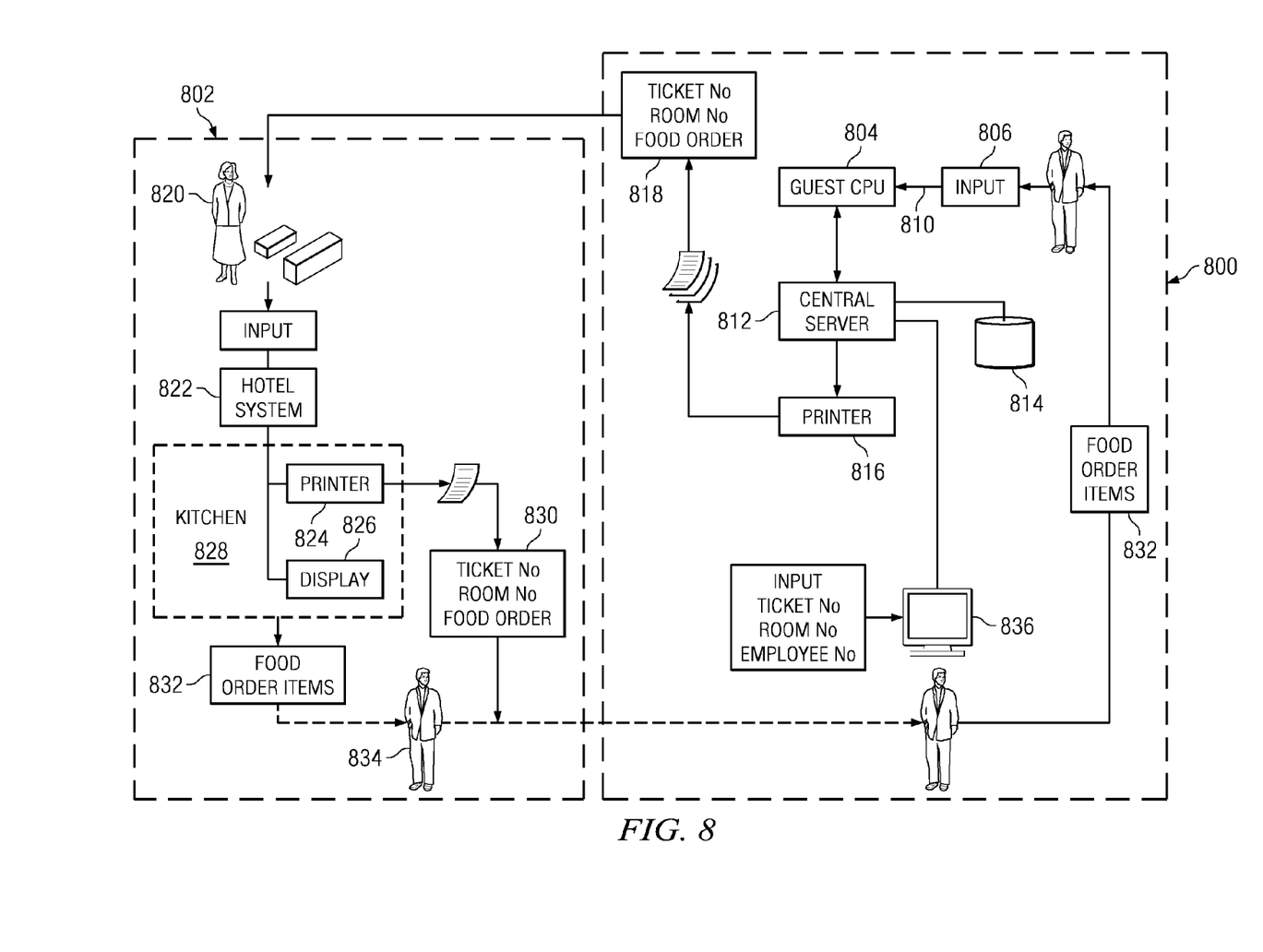
FIG. 8 is a second schematic representation of a system for processing room service orders according to one embodiment.

Turning to FIG. 8, in one embodiment, an order processing generally designated 800 is configured to be used with an existing hotel food service and billing system generally designated 802. System 800 includes a guest processor 804, preferably located in the guest's room or other convenient location. Guest processor 804 receives an input 806, for example an order for food, from guest 808 by means of an interface represented by arrow 810. Interface 810 may be a graphical user interface, keyboard, voice recognition module, wireless transceiver or similar device. Input 806 is typically an order for food or other items or services that may be supplied by the hotel.

When completed, input or guest order 806 is transmitted from guest processor to a central server 812. Central server 812 has an associated data storage device 814 with one or more databases that may contain information such as room numbers and room layouts, menus, prices, records of guest transactions, screen displays of food items and other amenities and records pertaining to hotel staff and employees, such as employee identification numbers and codes. Central server 812 is also interfaced with a printer 816 which may be located at any convenient location.

After central server 812 receives order input 806 from guest processor 804, the order may be printed with printer 816 in the form a ticket 818. Ticket 818 will typically include a ticket or transaction number, the room number or location of the guest processor and the food order. In one embodiment, a hotel staff member 820 enters the information from ticket 818 into the hotel system 822. Hotel system 822 may include billing and/or accounting functions, employee information, and other records, programs and functions used in the hotel's operations. Entry of the information from ticket 818 into hotel system 822 allows the hotel to associate charges for food or other services with guest rooms.

In the illustrated embodiment, hotel system 822 is interfaced with a printer 824 and a display device such as a monitor 826 near or in kitchen or food preparation area 828. In one variation, printer 824 and display 826 may comprise a point of sale device. Order 806 may be displayed on display device 826 and/or printed in the form of a ticket 830 with printer 826 for use by hotel food preparation staff which the staff uses to prepare the food order items 832. After food order items 832 are prepared and ready for delivery, a hotel staff member 834 uses a terminal 836 to enter the ticket number, the guest room number and an employee identification number or code. As illustrated terminal 836 is part of system 802 and is interfaced with central server 812 which stores a record of the transaction. Food order items 832 may then be delivered to the guest's room. In one embodiment, after delivery of the order, the hotel staff member may confirm delivery of the order with guest processor 804 upon delivery of the order to the guest's room. Central server 812 stores a record of the completed transaction on data storage device 814.

Figure 9:
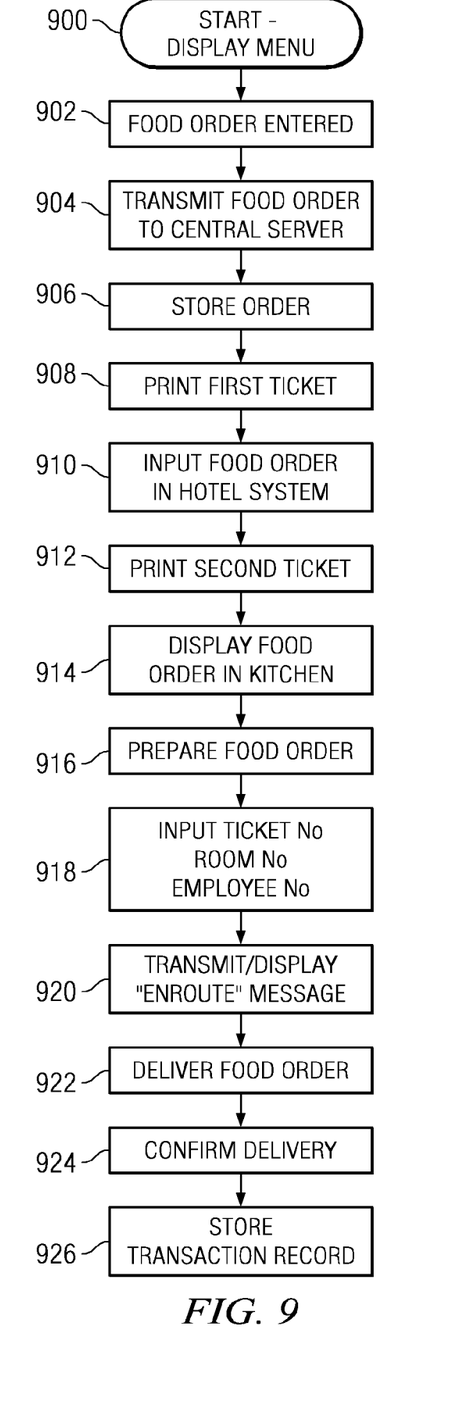
FIG. 9 is a flowchart illustrating a method of providing room service employing the system of FIG. 8.

FIG. 9 is a flowchart illustrating a method employing system 800 of FIG. 8. Referring to FIGS. 8 and 9, the process begins at step 900 wherein a menu is displayed to a guest using guest processor 804 and interface 810. At step 902, an order for food and/or other items or services is entered using guest processor 804 and interface 810. The order is transmitted to central server 812 which records the order information on data storage device 814 at step 908.

At step 908, the first ticket 818 is printed and the ticket information, i.e., the ticket number, room number and food order is entered into hotel system 822 at step 910. A second ticket with the same information is printed at step 912 with printer 824 for use by the hotel food service staff in preparing the order and/or the ticket information displayed with display 826. The order is prepared at step 916. After the food order is prepared, the ticket number, room number and an employee identification number is entered at step 918 by hotel staff using terminal 836 and transmitted to central server 812.

In one embodiment, a "food enroute" message is transmitted to guest processor 804 at step 922 and displayed to inform the guest that his or her order is on its way the guest room. At step 922 the food is delivered to the guest room. At step 924, delivery of the order may be confirmed by the staff member that delivered the order using guest processor 804 and interface 810 or terminal 836. The confirmation is transmitted to central server 812 and a transaction record for the order is stored by the server on data storage device 814 at step 926.

As will be appreciated, system 800 may be employed with an existing hotel food service and billing and or accounting systems. In one embodiment, system 800 may be owned and operated by a third party. Since the interface between the two systems is provided by manual entry of order information, system 800 may be employed with proprietary accounting and billing systems.

Figure 10:
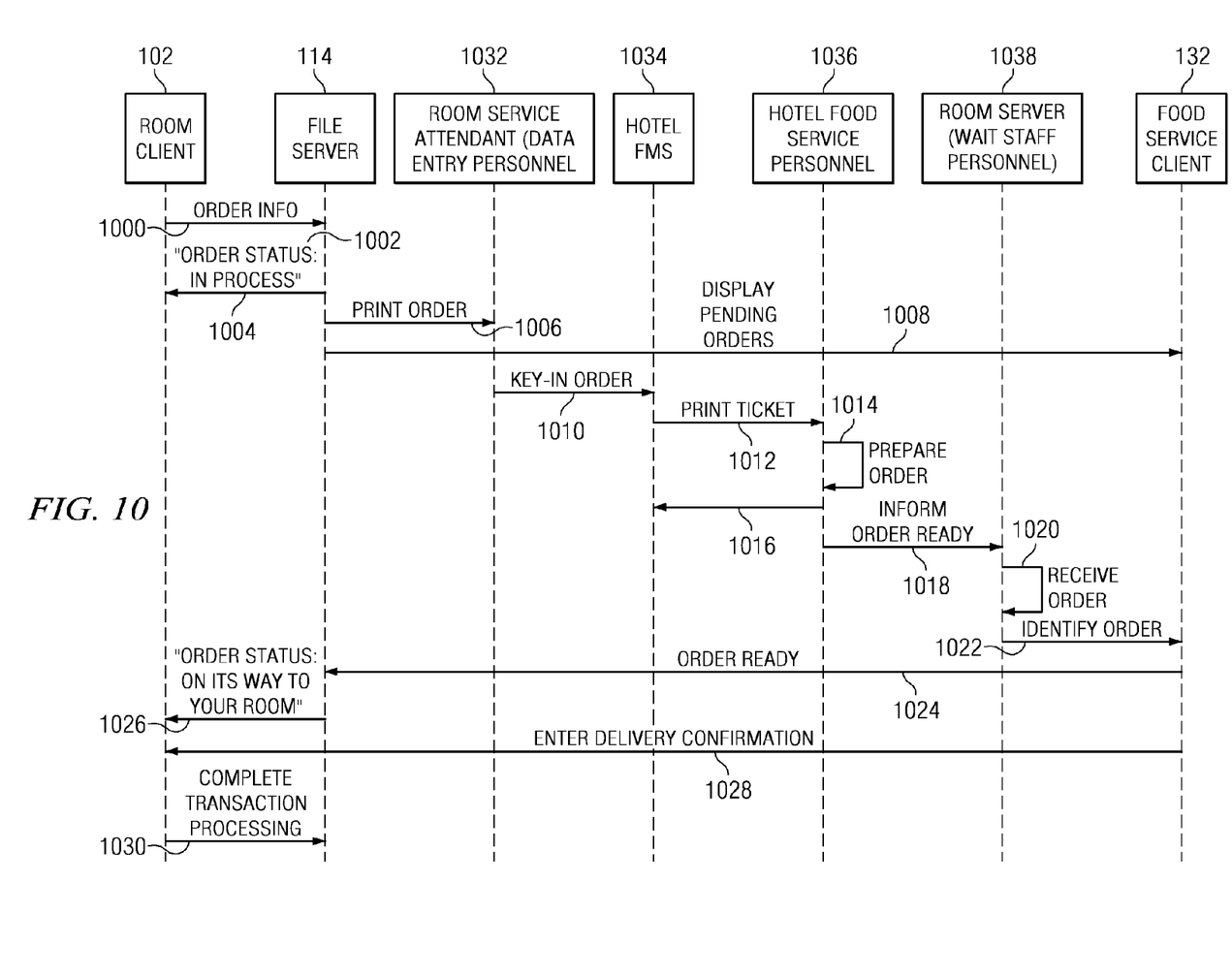
FIG. 10 is a flowchart further illustrating a method of providing room service according to the disclosure.

FIG. 10 is a flow chart further illustrating a method of providing room service. Referring to FIGS. 1 and 10 together, at step 1000, a guest enters order information using a room client, e.g. interactive user device 102 of FIG. 1. The guest order is received by file server 114 which transmit an order status message back to the room client where an "in process," "order being prepared" or similar message is displayed to the guest by the room client device 102. At step 1006, the order is printed for use by the hotel staff. The printed order may be in the form of a first ticket including a ticket number, room number and food order. The order is also displayed to a food service client, for example at a server station 132 (FIG. 1) at step 1008.

At step 1010, a room service attendant (data entry personnel) schematically represented at 1032 utilizes the ticket to manually enter the order information, i.e., the ticket number, room number and food order at step 1010 into the hotel food service or billing system 1034. After the order is entered, a ticket is printed at step 1012 for use by hotel food service personnel 1036 to prepare the order. The order is prepared at step 1014, after which food service personnel 1036 enter the status of the order into hotel food service or billing system 1034. The hotel and the room server (wait staff personnel) 1038 are informed that the order is ready for delivery at step 1018 and receive the ordered food at 1020.

At step 1022, the wait staff member who has received the food for delivery may identify the order, for example by entering the ticket number, room number and an employee identification number using a food service client, e.g., server station 132 (FIG. 1) to input the information. A message is then transmitted from the food service client 132 to file server 114 at step 1024 indicating that the ordered food is ready. File server 114 then transmits a message at step 1026 to room client 102 which displays a message informing the guest that the ordered food is enroute to his or her room at step 1026.

At step 1028 the order delivery is confirmed. The order delivery may be confirmed by a wait staff member using room client 102 or a food service client 132. The confirmation is transmitted to server 114 and a transaction record for the order is stored by the server at step 1030.

It will be appreciated that the system and method described herein may be used for purposes other than ordering food and beverages for delivery to a hotel or guest room. For example, the system may be used to communicate with a concierge to arrange various services such as transportation, to make reservations for a spa associated with a hotel, to arrange for valet services, to purchase event tickets and arrange for outings and to order items from a hotel gift shop.

It will be appreciated by those skilled in the art having the benefit of this disclosure that this method and system for providing room service provides a convenient, efficient means of processing room service orders in institutions such as hotels. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of processing room service transactions in an institution having a plurality of guest rooms, the method comprising:
   a) displaying selected visual representations of food items at preprogrammed intervals with an interactive graphical user interface located in a guest room, the visual representations being selected based on the time of day, the visual representations comprising images of selected food items;
   b) displaying a prompt to a guest in the guest room with the interactive graphical user interface;
   c) receiving a begin input from the guest with the interactive graphical user interface to initiate a room service transaction;
   d) displaying a food selection menu;
   e) receiving a selection input with the interactive graphical user interface, the selection input corresponding to a food item;
   f) storing the selection with a first data storage device uniquely associated with the graphical user interface, the first data storage device connected to and located in the guest room with the graphical user interface;
   g) displaying the food items selected by the guest in step e);
   h) repeating steps d), e) and f) until receiving a place order input from the guest with the graphical user interface;
   i) displaying a summary of selected food items with the graphical user interface, the summary corresponding to those items selected by the guest;
   j) receiving one of:
      i) a continue ordering input and returning to step d);
      ii) a change order input and returning to step d); or
      iii) an order confirmation input confirming the selection of food items;
   k) transmitting a confirmed food order including the selections chosen by the guest in steps e) and f) to a food service server, the food service server having an associated second data storage device, a processor, a first printer and a data interface with one or more server stations;
   l) printing a first ticket with the first printer using the information from the confirmed food order, the first ticket including a ticket number, room number and the food order;
   m) displaying a message with the interactive graphical user interface, the message indicating to the guest that the food order is being prepared;
   n) manually entering the first ticket information into an institution server, the institution server having an associated second printer and display;
   o) printing a second ticket with the second printer the second ticket including the ticket number, room number and the food order;
   p) manually entering the ticket number, room number and an employee identification into the food service server;
   q) after step o), displaying a message with the interactive graphical user interface, the message indicating the food order is enroute to the guest's room;
   r) delivering the food order to the guest room;
   s) receiving, with the food service server, a delivery confirmation message, the delivery confirmation message input with the interactive graphical user interface in the guest room; and
   t) storing a transaction record for the food order with the institution server on a third data storage device associated with the institution server.

2. The method of claim 1 further comprising the step of storing a record of the room service transaction on the second data storage device associated with the food service server.

3. The method of claim 1 further comprising receiving a report request with a server station and generating a report of room service transactions for a predetermined period of time with the food service server.

4. The method of claim 1 further comprising using a wireless interface to interconnect a plurality of interactive graphical user interfaces in guest rooms with the food service server.

5. The method of claim 1 further comprising using a wireless interface to interconnect the food service server with a server station.

6. The method of claim 2 further comprising translating the confirmed food order with the food service server into a format suitable for use by a separate point-of-sale device; and transmitting the translated, confirmed food order to the point-of-sale device.

7. The method of claim 2 further comprising displaying food selection visuals to the guest with the interactive graphical user interface, the food selection visuals representing food items available at the time the begin input is received.

8. The method of claim 1 further comprising receiving one or more of an employee identifier, the guest room number and a transaction identifier with the server station before the food order is delivered, wherein the employee identifier identifies the employee who receives the food order for delivery, the guest room number identifies the room to which the food order is to be delivered to and the transaction identifier identifies the specific transaction.

9. The method of claim 8 further comprising transmitting the one or more of the employee identifier, the guest room number and transaction identifier from the server station to the food service server and storing the same on the second associated data storage device.

10. The method of claim 1 wherein the step of displaying selected visual representations of food items at predetermined intervals with an interactive graphical user interface in a guest room further comprises displaying alternating images of different food items for intervals less than ten seconds.

11. The method of claim 1 further comprising preparing the food order and acknowledging receipt of the prepared food order before delivering the food order to the guest room.

12. The method of claim 2 further comprising displaying a menu selection screen whereby a guest may select from a plurality of different menus with the interactive graphical user interface.

* * * * *